UNITED STATES PATENT OFFICE.

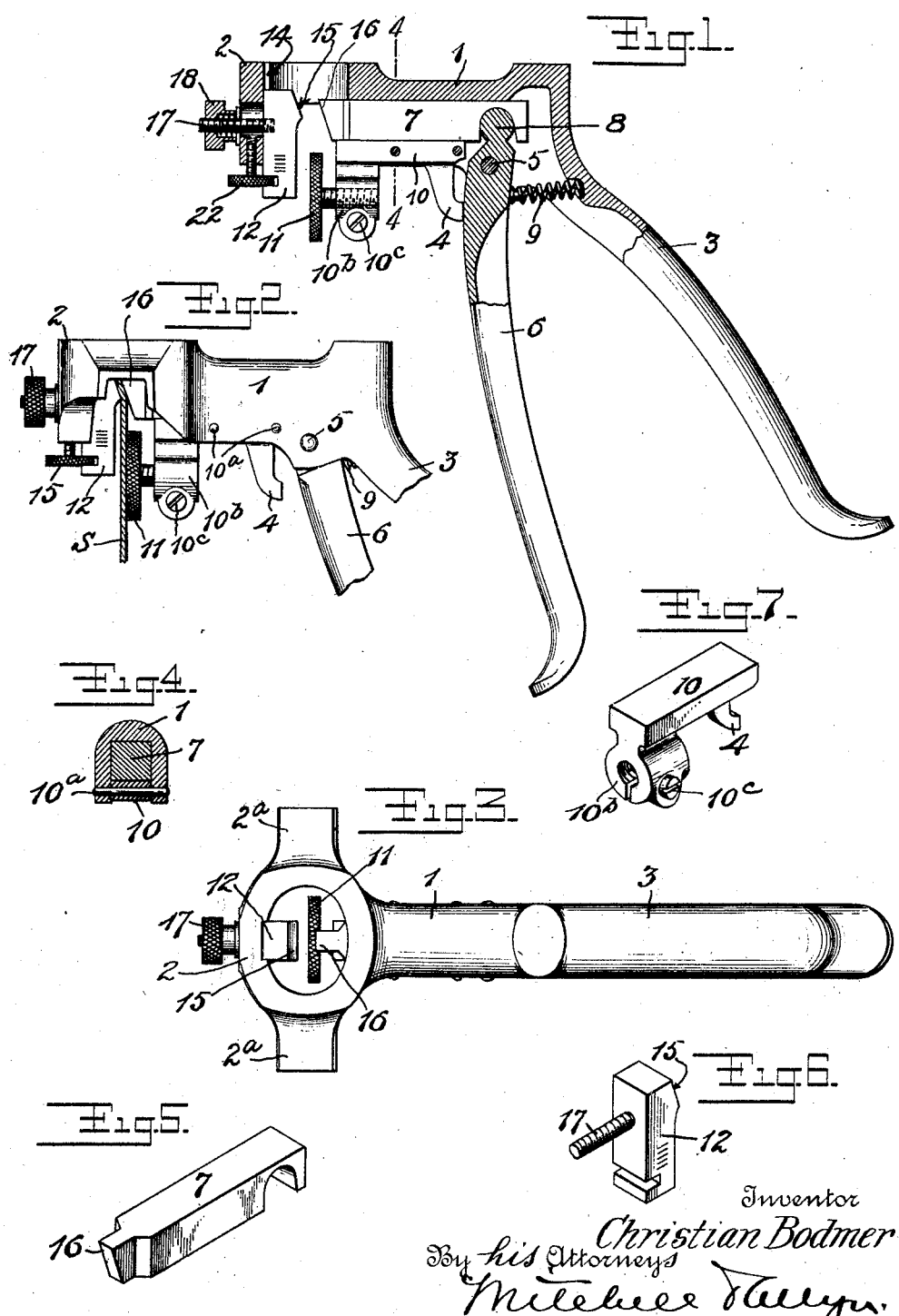

CHRISTIAN BODMER, OF NEW BRITAIN, CONNECTICUT, ASSIGNOR TO THE STANLEY WORKS, OF NEW BRITAIN, CONNECTICUT, A CORPORATION OF CONNECTICUT.

SAW-SET.

1,378,650. Specification of Letters Patent. Patented May 17, 1921.

Application filed April 22, 1920. Serial No. 375,678.

*To all whom it may concern:*

Be it known that I, CHRISTIAN BODMER, a citizen of the United States of America, residing at New Britain, Connecticut, have invented a new and useful Saw-Set, of which the following is a specification.

My invention relates to tools for setting saw teeth, and the present invention is primarily an improvement on that particular type of saw setting device set forth in my former Patent #1,199,232 of September 26, 1916. The present invention aims improving certain features of construction whereby the tool is rendered more efficient in operation and in adjustment, and is capable of operating on heavier saw blades and on blades of any gage or thickness. The adjusting mechanism is also improved in that there is practically no danger of breakage or displacement in the event the tool should be accidentally dropped. These and other advantages will appear to the mechanic skilled in the art and in the use of such devices.

In the drawings:

Figure 1 is a side elevation of the complete tool the upper portion being shown in section.

Fig. 2 is a side elevation of the upper part of the tool.

Fig. 3 is a plan view of the tool.

Fig. 4 is a cross-section on the plane of the line 4—4 of Fig. 1.

Figs. 5, 6, and 7 are perspective views of details.

The main frame of the tool comprises the body 1, the forward end of which is widened at 2 to provide an oval sight opening. At each end of this part of the tool are two wing extensions $2^a$—$2^a$ which are channeled on the underside to form bearing faces for the edge of a saw. 3 is a rigid handle extending downwardly from the rear of the frame 1. 10 is a block removably mounted in the bottom of the body 1, and which when in place is rigidly held by suitable fastenings such as pins $10^a$. 6 is a movable handle pivoted at 5 in the underside of the frame and having a knuckle 8 which is arranged to take into a notch in a reciprocating plunger 7 guided between the top wall of the frame 1 and the block 10. 4 is a stop shoulder which is preferably integral with the block 10, and which projects downwardly therefrom to act as an effective stop for the handle 6. 9 is a spring tending to separate the two handles 3—6 so as to normally retract the plunger 7. Depending from the front end of the block 10 is a screw threaded socket $10^b$. 11 is an adjusting screw which is adjustable in the socket $10^a$, the head of said screw being of substantial width to constitute an adjustable saw positioning gage. 12 is an anvil block mounted in a vertical guideway 14 at the forward side of the oval sight opening. This anvil block is provided with an anvil face 15 which is oblique relatively to the face of the saw positioning gage 11. 16 is a tooth bending nose on the forward end of the plunger 7, the said nose being formed at an angle to correspond to the anvil face 15. 22 is the head of an adjusting screw, which head takes into a notch in the head of the block 12, while the screw proper may be turned up and down in the front wall of the part 2 so that said anvil block may be adjusted vertically whereby more or less of the anvil face 15 will be exposed according to the length of the saw tooth to be set thereby. 17 is a screw carried by the anvil block 12 and passing through a slot in the front wall of the part 2. 18 is a lock nut mounted on the screw 17. When the anvil piece 12 has been properly adjusted by the screw 22, the nut 18 is screwed down to hold the block rigidly in that position for use. $10^c$ is a screw which serves to pinch together the two sides of the socket $10^b$ to hold the gage 11 in its proper position of adjustment.

Operation: When the operator wishes to set the teeth of any particular saw, he first adjusts the side gage 11 forward or back so that the side of the saw blade body will just touch the highest point of the anvil 12 at the base of the bevel 15. This adjustment guarantees the proper positioning of a saw blade no matter what its gage or thickness may be, so that the teeth thereof will be set at the desired angle. In Fig. 2, S indicates the saw blade. When the gage 11 is properly adjusted and locked, the anvil block 12 is then adjusted up and down until the highest point at the base of the bevel 15 is locked adjacent to the base of the saw tooth to be set. When this adjustment is effected the anvil block 22 is locked. The tool is then employed in the same manner as the tool of my former patent, that is to say, the set is applied to the toothed edge of a saw, and the tooth bending nose 16 is faced up with the particular tooth to be set, then, by pinching the handles 6—3 together, that particular tooth is quickly and accurately set. This operation is repeated with all of the teeth in the usual manner. The wings 2ª—2ª channeled on the underside furnish a broad and relatively long bearing overlapping several teeth at each end so that danger of injury to points of the teeth will be greatly lessened. Furthermore, this furnishes a better bearing and greatly increases the ease with which the tool may be operated.

It will be noted that the edge of the screw 22 is inside of a line extending from the edge of the nut 18 to the end of the handle 6, hence, if the device is dropped on the floor, the head of the adjusting screw 22 will be protected from contact and will not be bent. This is also true of the gage screw 11.

What I claim is:—

In a saw set, a main body having a sight opening in its forward portion, a vertically adjustable anvil at the forward side of said body and in the zone of said sight opening, a plunger carried by said body portion and movable to and fro in a channel in the underside thereof and operating at right angles to said anvil, a cover plate for holding said plunger in place in said channel, a pair of depending clamping jaws adjacent the front end of said plate and having a threaded passage between them, a stop having a threaded stem adapted to said threaded passage and held by said jaws, said stop having a vertical saw supporting face adjustable to and fro only, and means carried by said jaws for locking said stop in adjusted position, and a lever carried by said body portion and operatively connected with said plunger to move the same.

CHRISTIAN BODMER.